Dec. 11, 1956          G. T. JOBE          2,773,786
ELECTROLYTE FOR PRIMARY GALVANIC CELLS
Filed June 12, 1953
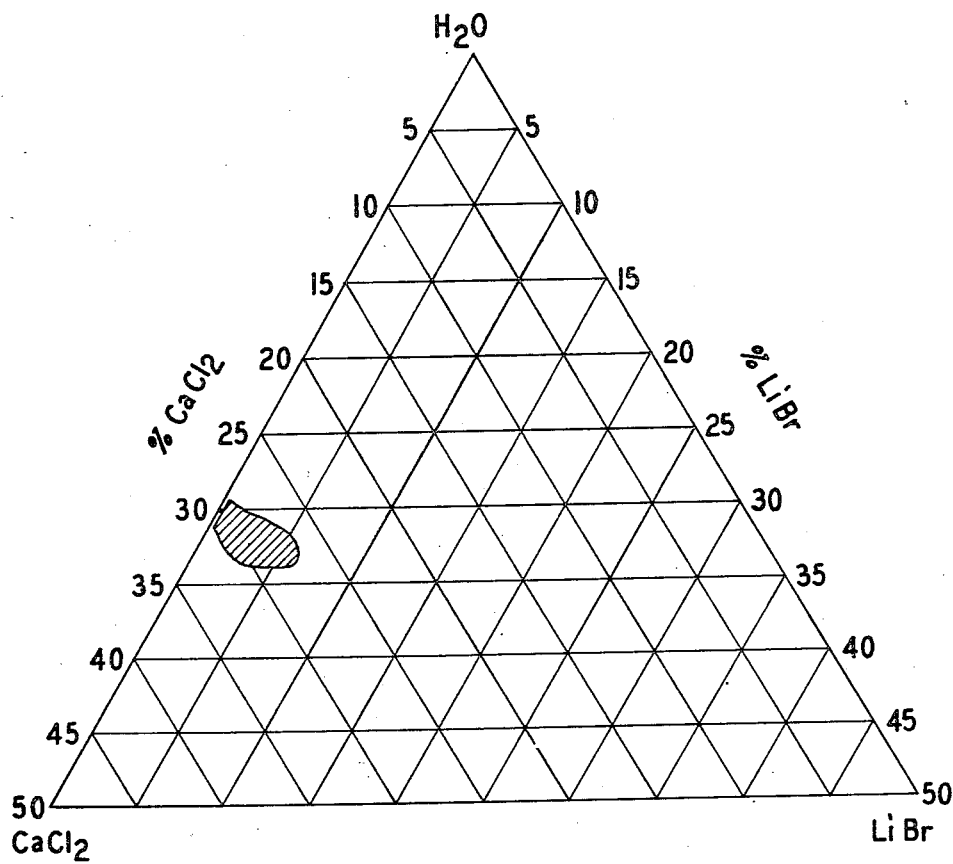
INVENTOR
GEORGE T. JOBE
BY
ATTORNEY 2,773,786
ELECTROLYTE FOR PRIMARY GALVANIC CELLS

George T. Jobe, Cleveland, Ohio, assignor to Union Carbide and Carbon Corporation, a corporation of New York Application June 12, 1953, Serial No. 361,192

2 Claims. (Cl. 136—155)

This invention relates to electrolytes for primary galvanic cells and has particular reference to electrolytes suitable for cells to be used at very low temperatures.

The principal object of the invention is the provision of an electrolyte for primary galvanic cells of the zinc-carbon-manganese dioxide type which makes such cells capable of use at the very low temperatures encountered at high altitudes and in frigid regions.

For the past several years the demand for primary cells capable of delivering good dependable service at low temperatures has been increasing apace for a variety of reasons. Although much time, effort, and money have been expended looking toward the development of such cells, and although substantial progress has been made by the development of new electrolytes, the demand for cells operable at temperatures of the order of —50° C. and below has not been satisfied.

The problem is not so simple as may at first appear; it has many facets. It is not enough to provide an electrolyte of very low freezing point. The electrolyte must have excellent electrical conductivity at low temperatures as well as at normal room temperature. And of course it must possess all the other attributes of a good electrolyte as well.

The present invention is an electrolyte which satisfies these requirements. It will be described with reference to the accompanying drawing, in which:

The sole figure is a ternary diagram setting forth the composition ranges of the electrolyte of the invention.

The invention is based on the discovery that the addition of a small quantity of lithium bromide to an aqueous electrolyte of the system calcium chloride-zinc chloride-ammonium chloride produces a marked lowering of the freezing point, or "first crystal point," of the system. Electrolytes of this system containing no lithium bromide are not entirely satisfactory for use at tempeartures below —40° C. and as the temperature of use is lowered the tolerance for ammonium chloride in the system is lowered. With the addition of lithium bromide to the calcium chloride-zinc chloride system containing up to 20% zinc chloride as much as 3% ammonium chloride may be present as added salt, and the resulting electrolyte is useful at temperatures as low as —50° C. Accordingly, the invention is an electrolyte comprising an aqueous solution containing 0.25% to 7% lithium bromide; 23% to 32% calcium chloride; the remainder water, to which may be added up to 20% zinc chloride and up to 3% ammonium chloride by weight of said solution. Ordinarily the lithium bromide content should not exceed 5%, and the calcium chloride content is at least 26%. A preferred range of compositions is that embraced within the hatched area of the drawing. A typical example of an electrolyte embodying the invention is one containing by weight 26.1% calcium chloride, 1.7% lithium bromide, 13% zinc chloride, the remainder water. An example of an electrolyte containing ammonium chloride is one containing by weight 26.8% calcium chloride; 1.8% lithium bromide; 8.9% zinc chloride; 1.8% ammonium chloride; the remainder water.

The following table sets forth several examples of electrolyte compositions embodying the invention, their freezing point, as determined by the first appearance of crystals on cooling, and their specific conductivity measured at 25° C.

Table

| Percent Composition | | | Percent Added Salt | | First Crystal Point, ° C. | Specific Conductivity, Mhos ×10⁴ at 25° C. |
|---|---|---|---|---|---|---|
| CaCl₂ | LiBr | H₂O | ZnCl₂ | NH₄Cl | | |
| 29 | 2 | 69 | | | —50 | 1,962 |
| 30 | 2 | 68 | | | —55 | 1,918 |
| 30 | 2 | 68 | 5 | | —55 | 1,797 |
| 31 | 2 | 67 | 10 | | —50 | 1,626 |
| 30 | 2 | 68 | 10 | | —58 | 1,690 |
| 30 | 2 | 68 | 10 | 1 | —55 | 1,724 |
| 30 | 2 | 68 | 10 | 2 | —56 | 1,778 |
| 30 | 2 | 68 | 10 | 3 | —50 | 1,816 |
| 30 | 2 | 68 | 15 | | —58 | 1,581 |
| 30 | 2 | 68 | 20 | | —58 | 1,459 |
| 30 | 3 | 67 | | | —52 | 1,897 |
| 28 | 5 | 67 | | | —54 | 1,897 |

It is evident from the data in the above table that the electrolyte of the invention has a freezing point not above —50° C. and has good electrical conductivity. Primary galvanic cells in which it has been utilized have operated successfully at —54° C.

What is claimed is:

1. In a low temperature primary galvanic cell of the zinc-carbon-manganese dioxide system having an aqueous electrolyte containing up to 20% zinc chloride and up to 3% ammonium chloride, the improvement which comprises the incorporation in such electrolyte of 23% to 32% calcium chloride and 0.5% to 7% lithium bromide by weight of electrolyte.

2. In a low temperature primary galvanic cell of the zinc-carbon-manganese dioxide system, the improved electrolyte which consists of an aqueous solution of calcium chloride an lithium bromide in the proportion embraced within the hatched area of the accompanying drawing and also contains by weight of solution up to 20% zinc chloride and up to 3% ammonium chloride.

References Cited in the file of this patent

UNITED STATES PATENTS 2,403,571   Wilke ------------------ July 9, 1946
2,445,306   Lawson ---------------- July 13, 1948

OTHER REFERENCES

Trans. Electrochemical Society, vol. 90, 1946, "Low Temperature Dry Cells," by Otto et al., pp. 419–432.

Trans. Electrochemical Society, vol. 90, 1946 "Dry Cell . . . containing Lithium Chloride . . . " by Wilke, pp. 433–440.

International Critical Tables, volume I, page 64.